(12) United States Patent
Karlsson (10) Patent No.: US 7,509,805 B2
(45) Date of Patent: Mar. 31, 2009

(54) CONTROL OF EXHAUST TO A TURBO OF INTERNAL COMBUSTION ENGINE

(75) Inventor: Erik Karlsson, Stockholm (SE)

(73) Assignee: SAAB Automobile AB (SE)

( * ) Notice: Subject to any disclaimer, the term of this patent is extended or adjusted under 35 U.S.C. 154(b) by 143 days.

(21) Appl. No.: 11/244,571

(22) Filed: Oct. 6, 2005

(65) Prior Publication Data

US 2006/0070382 A1      Apr. 6, 2006

(30) Foreign Application Priority Data

Oct. 6, 2004     (SE)     .................................. 0402409

(51) Int. Cl.
- *F02B 33/44*     (2006.01)
- *F02B 37/00*     (2006.01)
- *F02B 37/007*    (2006.01)
- *F02B 37/013*    (2006.01)

(52) U.S. Cl. ........................................ 60/612; 123/562

(58) Field of Classification Search ................... 60/612; 123/562, 559.1; *F02B 37/00, 37/007, 37/013, F02B 37/12*

See application file for complete search history.

(56) References Cited

U.S. PATENT DOCUMENTS

| | | | |
|---|---|---|---|
| 4,538,574 A * | 9/1985 | Lombardi | 60/612 |
| 4,993,228 A | 2/1991 | Tashima et al. | 60/612 |
| 5,201,790 A | 4/1993 | Mukai et al. | 60/612 |
| 5,845,495 A * | 12/1998 | Schray et al. | 60/612 |
| 6,253,551 B1 * | 7/2001 | Lohmann et al. | 60/612 |
| 7,076,955 B2 * | 7/2006 | Herz et al. | 60/612 |

FOREIGN PATENT DOCUMENTS

| | | | |
|---|---|---|---|
| DE | 3629841 A1 * | 5/1987 | |
| EP | 1400667 A2 * | 3/2004 | |
| JP | 61164039 A * | 7/1986 | |
| JP | 01285619 A * | 11/1989 | |
| JP | 03033430 A * | 2/1991 | |
| JP | 03229921 A * | 10/1991 | |
| JP | 05156960 A * | 6/1993 | |
| JP | 07293262 A * | 11/1995 | |
| WO | WO 2005068802 A2 * | 7/2005 | |

OTHER PUBLICATIONS

A Translation JP 07-293262 A.*

* cited by examiner

*Primary Examiner*—Thai-Ba Trieu
(74) *Attorney, Agent, or Firm*—Ostrolenk, Faber, Gerb & Soffen, LLP (57) ABSTRACT

An internal combustion engine has a plurality of cylinders, and each cylinder has at least one first and one second exhaust port with associated respective first and second exhaust valves. At least one first and one second exhaust manifold are flow-connected to the respective first and second exhaust ports. A turbo unit for supercharging the charge air delivered to the cylinders comprises at least one first and one second exhaust gas turbine respectively flow connected to the first and the second exhaust manifolds. An exhaust gas chamber flow-connects the first and the second exhaust manifolds upstream of the exhaust gas turbines. The first and second exhaust valves can be deactivated/activated during operation. A throttle valve in the exhaust gas chamber may assume a closed position in order to separate the first and the second exhaust manifolds. A method of operating includes opening and closing different valves at different engine speeds.

13 Claims, 4 Drawing Sheets

CONTROL OF EXHAUST TO A TURBO OF INTERNAL COMBUSTION ENGINE

TECHNICAL FIELD

The present invention relates to an internal combustion engine and particularly to control over exhaust gas outlet for efficient operation of a turbo.

BACKGROUND ART

Current demands for a low fuel consumption and high engine performance from internal combustion engines intended for vehicles have led to ever more powerful supercharging systems. Supercharging systems working in parallel and in tandem, such as two exhaust gas turbines arranged in parallel, where one operates at low engine speeds and the other exhaust gas turbine is only connected at high engine speeds, are already known. One advantage of these systems is that they afford good low-speed characteristics when small volumes of exhaust gas are directed exclusively to the first exhaust gas turbine and good high-speed characteristics when large volumes of exhaust gas are directed to both of the exhaust gas turbines.

The United States patent documents U.S. Pat. Nos. 4,993,228 and 5,201,790 show this type of supercharging system, which comprises a turbo unit having a first and a second exhaust gas turbine coupled to a first and a second exhaust manifold, respectively. These exhaust manifolds are arranged independently of one another in respect of each cylinder, that is the first exhaust manifold is connected to a first exhaust port in each cylinder, while the second exhaust manifold is connected to a second exhaust port in each cylinder. At partial load only the first exhaust gas turbine is connected, while the second exhaust gas turbine is connected, via a first throttle valve, only at higher engine loads. The second exhaust gas turbine can be "slip-started", via a second throttle valve and while the first throttle valve is closed, by means of excess exhaust gases, instead of these exhaust gases being "wastegated" away. This increases the sensitivity of the second exhaust gas turbine when the first throttle valve opens and the second exhaust gas turbine is fully connected.

A disadvantage of these solutions is that they make poor use of the energy contained in the exhaust gases, since two exhaust manifolds have to be heated up when the engine is started up, which means that it takes longer for a catalytic converter to get up to working temperature.

Another disadvantage is that the load on the different turbines is uneven, which can result in uneven wear to the turbines.

OBJECT OF THE INVENTION

An object of the present invention is to provide an improved internal combustion engine having a supercharging system, which is efficient at partial load and low engine speeds.

A further object is to provide a simpler supercharging system, which at the same time makes efficient use of the energy present in the exhaust gases.

Another object is to provide an internal combustion engine having a supercharging system with a long service life.

Other features and advantages of the present invention will become apparent from the following description of the invention which refers to the accompanying drawings.

DISCLOSURE OF INVENTION

These objects are achieved by an internal combustion engine of the type described in the introductory part and having distinctive features. An internal combustion engine has a plurality of cylinders, and each cylinder has at least one first and one second exhaust port with associated respective first and second exhaust valves. At least one first and one second exhaust manifold are flow-connected to the respective first and second exhaust ports. A turbo unit for supercharging the charge air delivered to the cylinders comprises at least one first and one second exhaust gas turbine respectively flow connected to the first and the second exhaust manifolds. An exhaust gas chamber flow-connects the first and the second exhaust manifolds upstream of the exhaust gas turbines. The first and second exhaust valves can be deactivated/activated during operation. A throttle valve in the exhaust gas chamber may assume a closed position in order to separate the first and the second exhaust manifolds. A method of operating includes opening and closing different valves at different engine speeds.

Since the first and second exhaust valves respectively can be deactivated/activated in operation and since a throttle valve arranged in the exhaust gas chamber is operable to assume a closed position in order to separate the first and the second exhaust manifolds, only the first exhaust manifold will receive exhaust gases from the cylinders, since the first and the second exhaust manifolds are not flow-connected to one another. This means that when the internal combustion engine is operating in a first engine speed range, when the internal combustion engine is working at low revolutions, excellent low-speed characteristics can be achieved since the exhaust gases will only expand over the one exhaust gas turbine.

Given the throttle valve location here, this exhaust valve arrangement moreover allows both the first and the second exhaust gas turbines to function as "primary" exhaust gas turbine, that is the turbine which is used on its own at low engine speeds, and as "secondary" turbine, that is to say the turbine which is only connected at higher engine speeds. The advantage is that more even loading and wear of the turbines (and of the exhaust valves, valves seats, etc.) can be achieved if their role as primary and secondary turbine can be alternated.

This solution also requires only one throttle valve for the control to function, in contrast to the solutions in the U.S. patent documents cited above, which require two throttle valves for the control to be effective.

The exhaust valves are suitably designed to be capable of continuous adjustment by electromechanical, electrohydraulic or pneumatic means. A more reliable control of the output torque of the internal combustion engine can thereby be achieved. In a later phase it will moreover be possible to introduce the second exhaust gas turbine gradually (since the lift height is continuously variable), which results in a more even transition from one to two compressors.

An exhaust duct suitably leads from the exhaust gas chamber to an exhaust passage situated downstream of the first and the second exhaust gas turbine, a regulating valve is arranged in the exhaust duct in order to regulate the exhaust gas flow through the latter. This means that if the first exhaust valves are kept in the active position, the second exhaust valves in the inactive position, the throttle valve in the closed position and the regulating valve in the open position during a starting phase of the internal combustion engine when it is cold, all the exhaust gases will be led directly to the exhaust passage. The catalytic converter(s) will thereby be heated up more rapidly (by the heat energy present in the exhaust gases) and will therefore come into operation more rapidly, that is to say the response time of the catalytic converter can be shortened. This is very important since the emissions during this period can be significant.

A first and a second exhaust line preferably lead from the first and the second exhaust manifolds respectively to a first and a second exhaust passage, which are separate from one another and are situated downstream of the first and the second exhaust gas turbine respectively. A first and a second regulating valve is arranged in each exhaust line respectively in order to regulate the exhaust gas flows through these lines. This means that if the first exhaust valves are kept in the active position, the second exhaust valves in the inactive position, the throttle valve in the closed position and the regulating valves in the open position during the starting phase of the internal combustion engine when it is cold, all the exhaust gases will be led directly to the first exhaust passage. Since the exhaust passage according to this variant is divided into a first and a second exhaust passage, the response time can be shortened even more, compared to the embodiment previously described, since the exhaust gases will meet less thermal resistance in the smaller first exhaust passage.

The first exhaust valves are suitably kept in the active position and the second exhaust valves in the inactive position when the internal combustion engine is operating in a second engine speed range, and the throttle valve is kept in the open position in order to allow exhaust gases from the first exhaust manifold to also pass to the first second exhaust gas turbine. This makes it possible to also lead exhaust gases from the first exhaust manifold to the second exhaust gas turbine. This means, for example, that when the load on the first exhaust gas turbine is deemed to be optimal and only the first exhaust valves are yet active, the throttle valve is opened and excess exhaust gases are led to the second exhaust gas turbine. The energy present in the exhaust gases can thereby be utilized efficiently instead of these exhaust gases being led off through a separate wastegate valve, for example.

The first exhaust valves are preferably kept in the active position and at least one of the second exhaust valves in the active position when the internal combustion engine is operating in a third engine speed range, the throttle valve being kept in the open position in order to allow exhaust gases from the first exhaust manifold to also pass to the second exhaust gas turbine. The energy present in the exhaust gases can thereby be utilized efficiently, in precisely the same way as in the second engine speed range, instead of these exhaust gases being led off through a separate wastegate valve, for example.

The first exhaust valves are suitably kept in the active position and the second exhaust valves in the active position when the internal combustion engine is operating in a fourth engine speed range, the throttle valve being kept in the open position and the regulating valve being kept in the open position in order to lead excess exhaust gases from each exhaust manifold directly to the exhaust passage. A good balance can thereby be created between the first and the second exhaust gas turbine, since the exhaust gas chamber will function as a "buffer" for the exhaust gases, so that the first and second exhaust gas turbine can operate more continuously. A less critical flow in the turbine area is furthermore achieved, thereby reducing the exhaust gas back-pressure, which in turn results in increased efficiency and greater absorption capacity through the turbines. This absorption capacity of the turbines means that the pressure downstream of the first and the second exhaust valves is reduced, which results in an internal combustion engine that encounters less resistance and thereby functions more efficiently. This also allows the use of smaller turbines, while retaining the same performance as for a larger turbine.

BRIEF DESCRIPTION OF THE DRAWINGS

Other objects and features of the present invention are described below with reference to the drawings attached, in which.

BEST MODES FOR CARRYING OUT THE INVENTION

Figure 1:
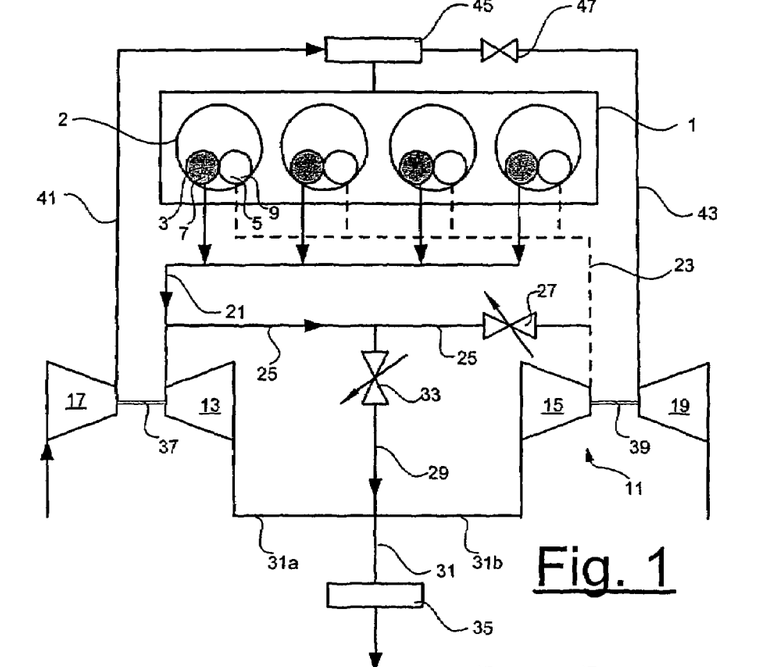
FIG. 1 shows a schematic representation of an internal combustion engine according to the invention and a control strategy intended for this when the internal combustion engine is cold.

FIG. 1 shows a schematic representation of an internal combustion engine according to the invention. The internal combustion engine 1, a four-cylinder in-line engine, is equipped with a first and a second exhaust port 3, 5 for each cylinder 2. The first and second exhaust ports are provided with first and second exhaust valves 7, 9 respectively for opening and closing the exhaust ports during operation of the engine. The exhaust valves 7, 9 can be individually controlled independently of one another by either electromechanical, electrohydraulic or pneumatic means, such means of valve control being already known in the art, for which reason they will not be described in more detail. The opening and closing of the valves 7, 9 is preferably continuously adjustable, so that their lift/timing can be varied as a function of the current engine operating condition and relevant parameters, in order to permit a high performance of the internal combustion engine 1. This type of valve control makes it possible, in contrast to conventionally cam-controlled valves, to deactivate certain exhaust valves under specific engine operating conditions. For example, the second exhaust valves 9 in each cylinder 2 might be deactivated and kept in an inactive condition at low engine speeds, while only the first exhaust valves 7 are active. Only at higher engine speeds would the second exhaust valves 9 be activated and allowed to function together with the first exhaust valves 7. The advantages of this type of valve control will be apparent from the description below. Another possibility is for both the first and the second exhaust valve 7, 9 in any one (or more) cylinders 2 to be deactivated and kept in the inactive state while under partial load, for example, which means that no activity occurs in these cylinders 2, but only in the remaining cylinders. Reasons for this type of valve control include, for example, exhaust emission and fuel consumption considerations under certain engine operating conditions.

The internal combustion engine also comprises a turbo unit 11, which according to the invention comprises a first and a second exhaust gas turbine 13, 15 with associated first and second compressor 17, 19. The first and the second exhaust gas turbine 13, 15 preferably have the same performance and capacity. The turbo unit 11 is a unit working in sequence and in parallel, which means that the first exhaust gas turbine 13 and the second exhaust gas turbine 15 are arranged and allowed to operate in parallel with one another and are activated in turn, which will be described in more detail below.

A first exhaust manifold 21 is connected to the first exhaust port 3 in each cylinder 2, while a second exhaust manifold 23 is connected to the second exhaust port 5 in each cylinder. This means that exhaust gases produced in each cylinder respectively will be led to the first exhaust manifold 21 if only the first exhaust valves 7 are active; led to the second exhaust manifold 23 if only the second exhaust valves 9 are active; and led to both the first and the second exhaust manifold 21, 23 if both the first and the second exhaust valves 7, 9 are active. The first exhaust manifold 21 leads to the first exhaust gas turbine 13, while the second exhaust manifold 23 leads to the second exhaust gas turbine 15. This means that the first exhaust ports 3 are flow-connected to the first exhaust gas turbine 13, while the second exhaust ports 5 are flow-connected to the second exhaust gas turbine 15.

An exhaust gas chamber 25 is arranged upstream of the first and the second exhaust gas turbine 13, 15 and flow-connects the first and the second exhaust manifold 21, 23. In the exhaust gas chamber 25 a throttle valve 27 is designed to open and close the connection between the first and the second exhaust manifold 21, 23, that is to say to prevent exhaust gases from the first exhaust manifold 21 getting into the second exhaust manifold 23, or exhaust gases from the second exhaust manifold 23 getting into the exhaust gas chamber 25 and further into the first exhaust manifold 21. The throttle valve 27 is designed to be controlled by a control unit (not shown), in order to permit opening and closing of the throttle valve 27 under certain operating conditions, which together with the advantages of this throttle valve arrangement will be apparent from the description below.

From the exhaust gas chamber 25 an exhaust port 29 bypasses the first and the second exhaust gas turbine 13, 15 and leads to an exhaust passage 31 arranged downstream of the first and the second exhaust gas turbine 13, 15. A control valve 33 arranged in the exhaust port 29 is designed, under certain engine operating conditions, to open and close in order to open up directly to the exhaust passage 31, thereby bypassing both the first and the second exhaust gas turbine 13, 15. This means that the exhaust gas chamber 25 upstream of the turbines can be flow-connected to the exhaust passage 31 downstream of the turbines if the regulating valve 33 is set to an open position. In this way the turbines 13, 15 can be bypassed, for example in the event of an excessively high exhaust gas pressure prevailing in the turbines. The outlet from each exhaust gas turbine 13, 15 opens into a part 31a, 31b respectively of the exhaust passage 31. The exhaust passage 31 leads to a precatalytic converter 35 and to a main catalytic converter (not shown), arranged downstream of the precatalytic converter, and to a silencer (not shown) and other exhaust-related equipment.

The first and the second compressor 17, 19 are each connected via a shaft 37, 39 to the first and second exhaust gas turbine 13, 15 respectively, so as to be able, when in operation, to compress charge air for delivery to the cylinders 2. For this purpose a first and a second intake pipe 41, 43 are shown, which lead charge air from the compressors to the cylinders via an air intercooler 45. A choke 47 arranged in the second intake pipe 43 is designed to function as a safeguard in the event of excessively high pressure levels.

FIG. 1 shows a starting phase of the internal combustion engine 1 when this is cold. It is important then to heat up the precatalytic converter 35 rapidly, so that it reaches its working temperature and can begin to function efficiently. For this reason the first exhaust valves 7 are set to the active position, while the second exhaust valves 9 are situated in the inactive position. The throttle valve 27 is furthermore set to the closed position and the regulating valve 33 to the open position. Consequently, during this starting phase, which may be in the order of 10 to 30 seconds, the exhaust gases will leave the cylinders 2 via the first exhaust ports 3, will be led through the first exhaust manifold 21, into the exhaust gas chamber 25, and will pass through the regulating valve 33 in the exhaust duct 29 until they reach the exhaust passage 31, which is situated downstream of the two exhaust gas turbines 13, 15, and will then reach the precatalytic converter 35. This will be heated by the energy in the hot exhaust gases. Since only one exhaust manifold 21 is open to exhaust gases, and the exhaust gases, in bypassing the turbines, encounter minimal thermal resistance, the heat energy present in the exhaust gases can be utilized to the full in heating up the precatalytic converter 35.

An equivalent function could naturally be obtained if the first exhaust valves 7 were instead kept in the inactive position, while the second exhaust valves 9 were kept in the active position. With this variant, however, the throttle valve 27 must be opened.

Figure 2:
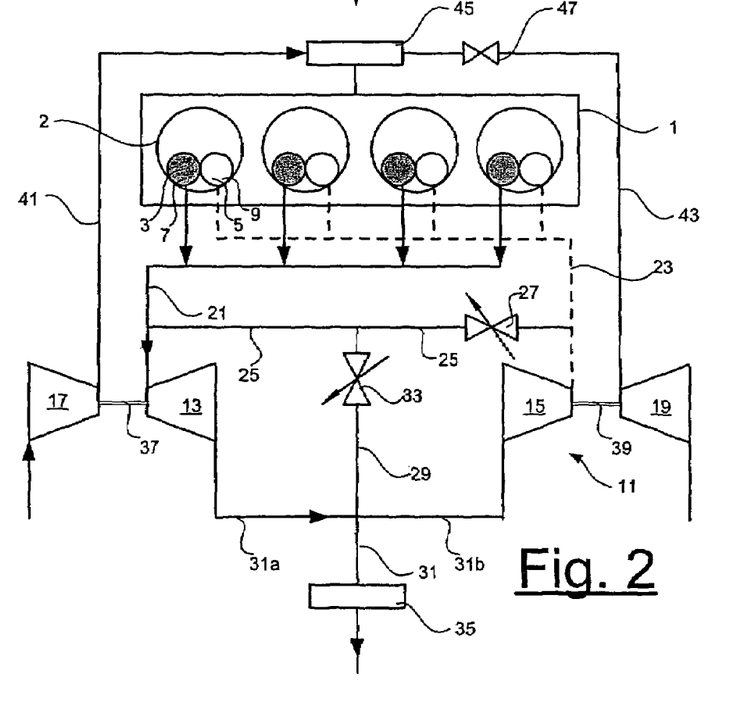
FIG. 2 shows a schematic representation of the internal combustion engine in FIG. 1 and a control strategy intended for this when the internal combustion engine is operating in a first engine speed range and with only the first exhaust valves active.

FIG. 2 shows a representation of the supercharging system when the internal combustion engine 1 is operating in a first engine speed range I (see FIG. 7), when the speed of the internal combustion engine is low. In this engine speed range at least one of the first exhaust valves 7 is active, while the second exhaust valves 9 are inactive. Both the throttle valve 27 and the regulating valve 33 are furthermore set to the closed position. The first and the second exhaust manifold 21, 23 will thereby be separated from one another and no exhaust gases will be able to bypass the turbines 13, 15. Instead the exhaust gases produced in the cylinders 2 will leave the cylinders via the first exhaust ports 7, will be led on through the first exhaust manifold 21 and expanded over the first exhaust gas turbine 13, and will thereafter reach the exhaust passage 31, for onward delivery to catalytic converters, silencers etc. This control strategy achieves excellent transient and low-speed characteristics, since all exhaust gases are forced to pass through the first exhaust gas turbine 13.

An equivalent function could naturally be obtained if the first exhaust valves 7 were instead kept in the inactive position, while the second exhaust valves 9 were kept in the active position. In this case also, the throttle valve 27 must be kept in the closed position.

Figure 3:
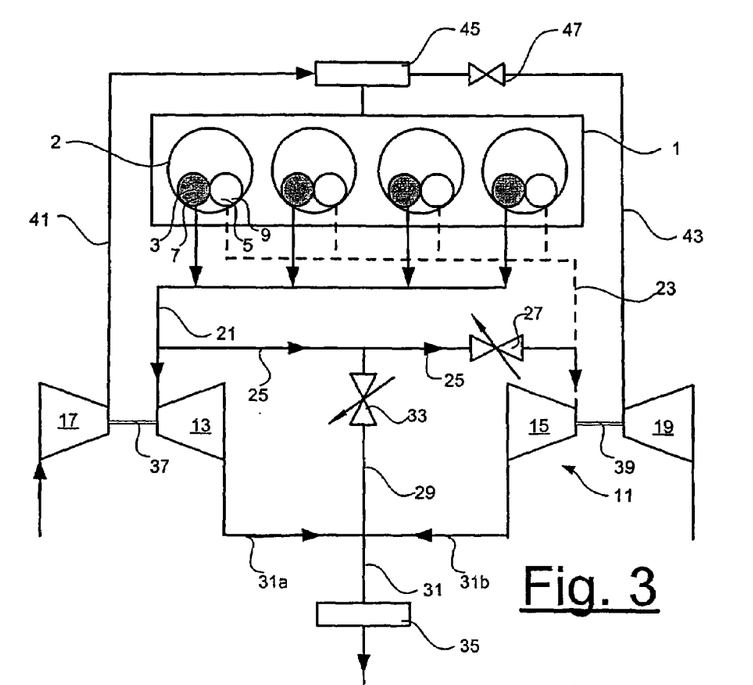
FIG. 3 shows a schematic representation of the internal combustion engine in FIG. 1 and a control strategy intended for this when the internal combustion engine is operating in a second engine speed range and with only the first exhaust valves active.

FIG. 3 shows a representation of the supercharging system when the internal combustion engine is operating in a second engine speed range II (see FIG. 7), when the engine speed is still relatively low, but is higher than in the first engine speed range I. The first exhaust valves 7 are still in the active position, while the second exhaust valves 9 are in the inactive position. The regulating valve 33 is furthermore kept in the closed position. The throttle valve 27 on the other hand has been opened somewhat (see curve S in FIG. 7, which shows the degree of opening of the throttle valve as a function of the number of revolutions). In this engine speed range II the exhaust gases produced in the cylinders 2 will, just as previously, leave the cylinders via the first exhaust ports 3 and will be led onward through the first exhaust manifold 21 for expansion over the first exhaust gas turbine 13. Furthermore, since the throttle valve 27 is set to a partially open position, the exhaust gases can also be allowed to expand over the second exhaust gas turbine 15. With this, the energy in the exhaust gases need not go to waste (through a wastegate valve, for example) when the load on the first exhaust gas turbine 13 is deemed optimal, but may be used to set the second exhaust gas turbine 15 in motion. This will also facilitate coupling of the first and second compressor 17, 19 at a later stage when the second exhaust valve 9 is also activated.

An equivalent function could naturally be obtained if the first exhaust valves 7 were instead kept in the inactive position, while the second exhaust valves 9 were kept in the active position. The throttle valve 27, like the regulating valve 33, must also in this case be kept in the open position.

Figure 4:
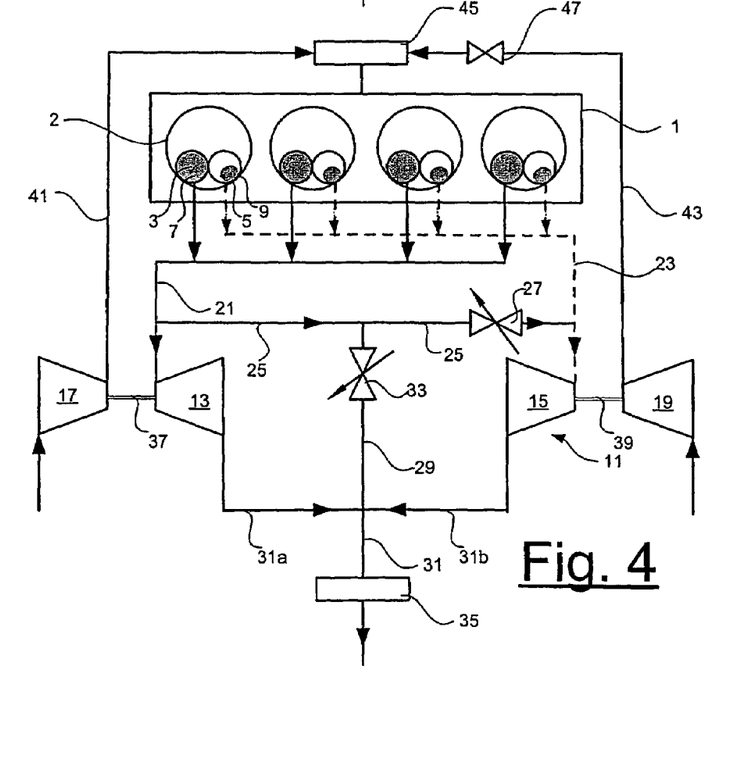
FIG. 4 shows a schematic representation of the internal combustion engine in FIG. 1 and a control strategy intended for this when the internal combustion engine is operating in a third engine speed range and with both the first and second exhaust valves active.

FIG. 4 shows a representation of the supercharging system when the internal combustion engine 1 is operating in a third engine speed range III (see FIG. 7), when the speed of the internal combustion engine is moderately high. In this engine speed range III the first exhaust valves 7 are kept in the active position and at least one of the second exhaust valves 9 in the active position, while the throttle valve 27 is kept in the open position. Even if the second exhaust valves 9 have now become active (see curve A in FIG. 7), they are not fully opened (which is indicated by a partially filled exhaust port 5) through suitable control of the lift and/or timing. This means that the exhaust gases produced in the cylinders leave the cylinders via the first exhaust ports 3, and are led onward through the first exhaust manifold 21 for expansion over the first exhaust gas turbine 13. Furthermore, the exhaust gases produced in the cylinders 2 will leave the cylinders via the second exhaust ports 5, and will be led onward through the second exhaust manifold 23 for expansion over the second exhaust gas turbine 15. Since the second exhaust valves 9 are not yet fully opened (see FIG. 7) and since the throttle valve 27 is opened, excess exhaust gases from the first exhaust manifold 21 will be led into the second exhaust manifold 23, via the throttle valve 27, for expansion over the second exhaust gas turbine 15.

An equivalent function could naturally be obtained if the situation of the first and second exhaust valves 7, 9 were reversed. The throttle valve 27, and the regulating valve 33, must also then be situated in the open and the closed position respectively.

Figure 5:
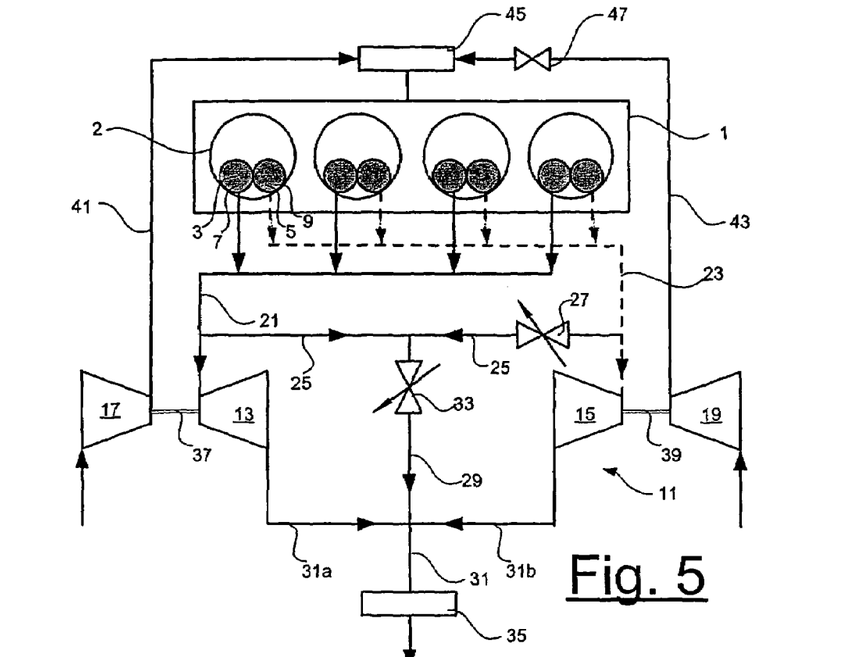
FIG. 5 shows a schematic representation of the internal combustion engine in FIG. 1 and a control strategy intended for this when the internal combustion engine is operating in a fourth engine speed range and with both the first and second exhaust valves active.

FIG. 5 shows a representation of the supercharging system when the internal combustion engine 1 is operating in a fourth engine speed range IV (see FIG. 7), when the engine speed and load are moderate to very high. In this engine speed range IV the first exhaust valves 7 are kept in the active position and the second exhaust valves 9 in the active position, both the throttle valve 27 and the regulating valve 33 are kept open (to what extent varies as a function of the prevailing engine speed and the load, see curves S and R in FIG. 7). This means that the exhaust gases produced in the cylinders leave the cylinders via the first and the second exhaust ports 3, 5, and are led onward through the first and the second exhaust manifold 21, 23 respectively for expansion over the first and second exhaust gas turbine 13, 15 respectively. By keeping the throttle valve 27 and the regulating valve 33 in the open position, the exhaust gas chamber 25 will firstly function as an "exhaust buffer" and a good balance will be created between the first and the second exhaust gas turbine 13,15, but above all a critical flow in the turbine area will be reduced in the event of excessively high pressure levels, since excess exhaust gases from both the first and the second exhaust manifold 21, 23 can be led off via the regulating valve 33 to the exhaust passage 31. The exhaust gas back-pressure can thereby be reduced, which has a positive effect on the engine pumping losses, so that the first and second exhaust gas turbine 13, 15 can operate more continuously.

Should the first exhaust gas turbine be switched from "primary" exhaust gas turbine to "secondary" turbine and the second exhaust gas turbine be switched from "secondary" to "primary" turbine, the choke 47 naturally needs to be moved from the current location in the intake pipe 43 to the intake pipe 41.

Figure 6:
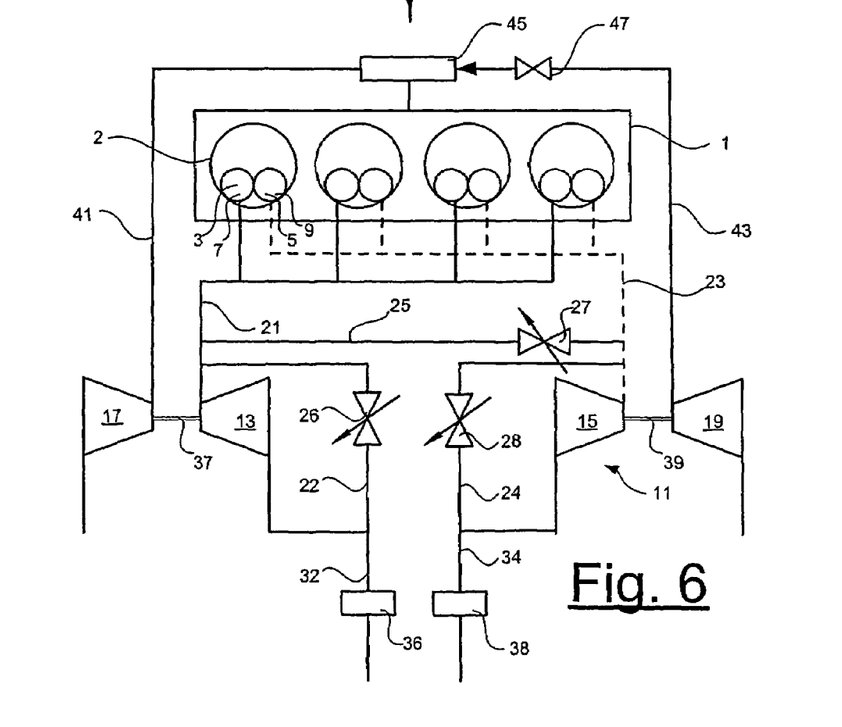
FIG. 6 shows a schematic representation of a variant of an internal combustion engine according to the invention.

FIG. 6 shows an alternative embodiment for bypassing to a first and second exhaust passage 32, 34, which are arranged downstream of the turbines 13, 15. From the first and second exhaust manifold 21, 23 a first and second exhaust line 22, 24 respectively bypass the turbines and lead to a first and second exhaust passage 32, 34. A first and second regulating valve 26, 28 are arranged in the exhaust line 22, 24 respectively, and are designed to open and close as a function of the engine speed and/or other engine operating parameters, for example, for the purpose of opening directly to the first and second exhaust passage 32, 34. A first and second precatalytic converter 36, 38 are arranged in each exhaust line 32, 24 respectively downstream of the turbines. This means that the exhaust manifolds 21, 23 upstream of the turbines 13, 15 can be kept in flow-connection with the first and second exhaust passage 32, 34 respectively downstream of the turbines 13, 15, should any of the regulating valves 26, 28 be opened. If need be, the turbines 13, 15 can thereby be bypassed. In principle, this alternative embodiment functions in precisely the same way as that described previously. One advantage of this arrangement, however, is that due to the reduced thermal resistance encountered by the exhaust gases it will be possible to reduce the light-off time of the catalytic converters 36, 38.

Figure 7:
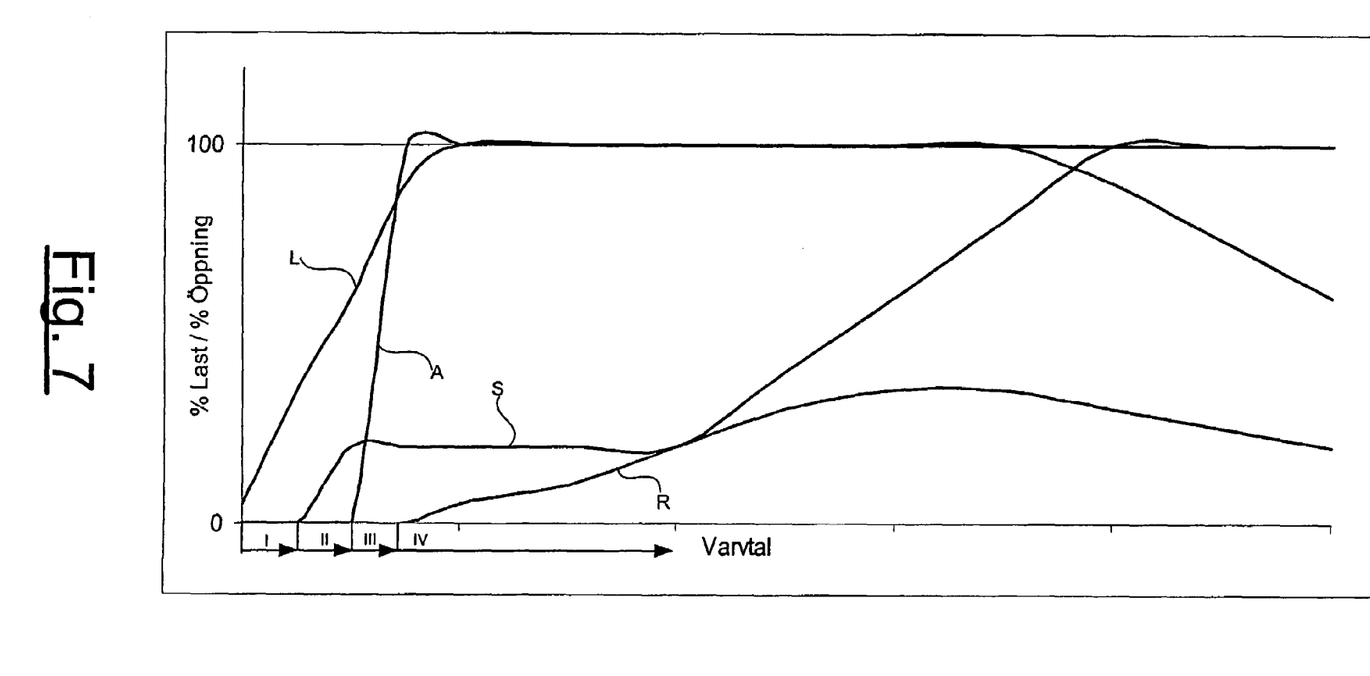
FIG. 7 shows a control matrix for controlling the throttle valves and valves forming part of the internal combustion engine as a function of the engine speed.

FIG. 7 shows a control matrix for controlling the valves in accordance with the description above and as a function of the number of revolutions of the internal combustion engine, that is to say in the first to the fourth engine speed range I-IV. Curve L describes the engine load as a function of the number of revolutions, curve A the percentage opening of the second exhaust valve 9 as a function of the number of revolutions, curve S the opening of the throttle valve 27 as a function of the number of revolutions and curve R describes the opening of the regulating valve 33 as a function of the number of revolutions. In the first engine speed range both the throttle valve 27 and the regulating valve 33 are closed, while the first exhaust valves are active and the second exhaust valves are inactive. In the transition between the first and the second engine speed range the throttle valve 27 is opened. In the transition between the second and third engine speed range the second exhaust valve 9 is opened and in the transition between the third and fourth engine speed range the regulating valve 33 opens. The extent to which the throttle valve 27 and the regulating valve 33 open in each range can be seen from the vertical axis, which in addition to the engine load also shows the percentage opening of valves and throttle valve.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for regulating an internal combustion engine, the engine comprising:
    a plurality of engine cylinders, each cylinder having at least one first and one second exhaust port and a respective associated first and second exhaust valves for opening and closing the first and the second exhaust ports, wherein the first and second exhaust valves are deactivated or activated during operation of the engine,
    at least one first and one second exhaust manifold, the first exhaust manifold being flow-connected to the respective first exhaust ports and the second exhaust manifold being flow-connected to the respective second exhaust ports;
    a turbo unit for supercharging charge air being delivered to the cylinders, the turbo unit comprising at least one first and one second exhaust gas turbine, wherein the first exhaust gas turbine is flow connected to the first exhaust manifold and the second exhaust gas turbine is flow-connected to the second exhaust manifold;
    an exhaust gas chamber operable to flow-connect the first and the second exhaust manifolds upstream of the exhaust gas turbines in the exhaust gas flow;
    the method comprising:
    operating at least one of the first exhaust valves in an active position and operating at least one of the second exhaust valves in an inactive position when the internal combustion engine is operating in a first engine speed range (I), and
    operating a throttle valve arranged in the exhaust gas chamber in a closed position to separate the first and the second exhaust manifolds during the first engine speed range (I).

2. The method for regulating an internal combustion engine according to claim 1, further comprising the steps of:
    operating the first exhaust valves in the active position and the second exhaust valves in the inactive position when the internal combustion engine is operating in a second engine speed range (II), and
    operating the throttle valve in an open position to allow exhaust gases from the first exhaust manifold to pass to the second exhaust gas turbine.

3. The method for regulating an internal combustion engine according to claim 1, further comprising the steps of:
    operating the first exhaust valves in the active position and at least one of the second exhaust valves in an active position when the internal combustion engine is operating in a third engine speed range (III), and
    operating the throttle valve in an open position in order to allow exhaust gases from the first exhaust manifold to pass to the second exhaust gas turbine.

4. The method for regulating an internal combustion engine according to claim 1, further comprising the steps of:
    operating the first exhaust valves in the active position and the second exhaust valves in an active position when the internal combustion engine is operating in a fourth engine speed range (IV),
    operating the throttle valve in an open position, and
    operating a regulating valve in an open position to lead excess exhaust gases from each exhaust manifold directly to an exhaust passage.

5. The method for regulating an internal combustion engine according to claim 1, wherein the internal combustion engine comprises
    an exhaust passage situated downstream in the gas flow of the first and the second exhaust gas turbines;
    an exhaust duct leading from the exhaust gas chamber to the exhaust passage; and
    a regulating valve arranged in the exhaust duct and operable for regulating the exhaust gas flow through the exhaust duct;
    the method further comprising the steps of:
    operating the first exhaust valves in the active position and the second exhaust valves in the inactive position during a starting phase of the internal combustion engine when the engine is cold,
    operating the throttle valve in a closed position; and
    operating the regulating valve in an open position.

6. An internal combustion engine, comprising:
    a plurality of engine cylinders, each cylinder having at least one first and one second exhaust port and a respective associated first and second exhaust valves for opening and closing the first and the second exhaust ports, the first and second exhaust valves being deactivated and activated during operation of the engine;
    at least one first and one second exhaust manifold, the first exhaust manifold being flow-connected to the first exhaust port of each engine cylinder and the second exhaust manifold being flow-connected to the second exhaust port of each engine cylinder;
    a turbo unit for supercharging charge air being delivered to the cylinders, the turbo unit comprising at least one first and one second exhaust gas turbine, the first exhaust gas turbine being flow connected to the first exhaust manifold and the second exhaust gas turbine being flow-connected to the second exhaust manifold;
    a first intake pipe and a second intake pipe flow connecting the turbo unit to the engine cylinders, the charge air being delivered from the turbo unit to the engine cylinders through the first and second intake pipes;
    a choke positioned in one of the first intake pipe and the second intake pipe;
    an exhaust gas chamber operable to flow-connect the first and the second exhaust manifolds upstream of the exhaust gas turbines in an exhaust gas flow; and
    a throttle valve arranged in the exhaust gas chamber and operable to assume a closed position to separate the first and the second exhaust manifolds, the throttle valve being operable to selectively flow-connect the first exhaust manifold to the first exhaust gas turbine when the engine is cold or is in a first engine speed range (I).

7. The internal combustion engine according to claim 6, further comprising an electromechanical, electrohydraulic or pneumatic device operable for continuously adjusting exhaust valves.

8. The internal combustion engine according to claim 6, further comprising:
    a first and second exhaust passage separated from one another and situated downstream respectively of the first and the second exhaust gas turbines;
    a first and a second exhaust line respectively leading from the first and second exhaust manifolds respectively to the first and second exhaust passages;
    a first and a second regulating valve arranged in the respective first and second exhaust lines for regulating the exhaust gas flow through the respective exhaust lines.

9. The internal combustion engine according to claim 6, further comprising:
    an exhaust gas passage situated downstream of the first and second exhaust gas turbines; and a regulating valve flow-connected to the exhaust gas chamber and operable to lead excess exhaust gases from the exhaust gas chamber to the exhaust passage, such that the excess exhaust gases bypass each of the first and second exhaust gas turbines.

10. The internal combustion engine according to claim 6, further comprising:
- first and second exhaust passages situated downstream respectively of the first and second exhaust gas turbines;
- first and second exhaust lines flow-connected to the first and second exhaust manifolds, respectively; and
- first and second regulating valves flow-connected to the first and second exhaust lines, respectively, and operable to lead excess exhaust gases from the first and first and second exhaust lines, respectively, such that the excess exhaust gases from the first and second exhaust lines bypass each of the first and second exhaust gas turbines.

11. An internal combustion engine, comprising:
- a plurality of engine cylinders, each cylinder having at least one first and one second exhaust port and a respective associated first and second exhaust valves for opening and closing the first and the second exhaust ports, the first and second exhaust valves being deactivated and activated during operation of the engine;
- at least one first and one second exhaust manifold, the first exhaust manifold being flow-connected to the first exhaust port of each engine cylinder and the second exhaust manifold being flow-connected to the second exhaust port of each engine cylinder;
- a turbo unit for supercharging charge air being delivered to the cylinders, the turbo unit comprising at least one first and one second exhaust gas turbine, the first exhaust gas turbine being flow connected to the first exhaust manifold and the second exhaust gas turbine being flow-connected to the second exhaust manifold;
- a first intake pipe and a second intake pipe flow connecting the turbo unit to the engine cylinders, the charge air being delivered from the turbo unit to the engine cylinders through the first and second intake pipes;
- a choke positioned in one of the first intake pipe and the second intake pipe;
- an exhaust gas chamber operable to flow-connect the first and the second exhaust manifolds upstream of the exhaust gas turbines in an exhaust gas flow; and
- a throttle valve arranged in the exhaust gas chamber and operable to assume a closed position to separate the first and the second exhaust manifolds, the throttle valve being operable to selectively flow-connect the second exhaust manifold to the second exhaust gas turbine when the engine is in the first engine speed range I.

12. The internal combustion engine according to claim 11, wherein the throttle valve arranged in the exhaust gas chamber is operable to selectively flow-connect the first exhaust manifold to the first exhaust gas turbine, or to both the first and second exhaust gas turbines.

13. An internal combustion engine, comprising:
- a plurality of engine cylinders, each cylinder having at least one first and one second exhaust port and a respective associated first and second exhaust valves for opening and closing the first and the second exhaust ports, the first and second exhaust valves being deactivated or activated during operation of the engine;
- at least one first and one second exhaust manifold, the first exhaust manifold being flow-connected to the first exhaust port of each engine cylinder and the second exhaust manifold being flow-connected to the second exhaust port of each engine cylinder;
- a turbo unit for supercharging charge air being delivered to the cylinders, the turbo unit comprising at least one first and one second exhaust gas turbine, the first exhaust gas turbine being flow connected to the first exhaust manifold and the second exhaust gas turbine being flow-connected to the second exhaust manifold;
- a first intake pipe and a second intake pipe flow connecting the turbo unit to the engine cylinders, the charge air being delivered from the turbo unit to the engine cylinders through the first and second intake pipes;
- a choke positioned in one of the first intake pipe and the second intake pipe;
- an exhaust gas chamber operable to flow-connect the first and the second exhaust manifolds upstream of the exhaust gas turbines in an exhaust gas flow;
- a throttle valve arranged in the exhaust gas chamber and operable to assume a closed position to separate the first and the second exhaust manifolds, the throttle valve being operable to selectively flow-connect the first exhaust manifold to the first exhaust gas turbine when the engine is cold or is in a first engine speed range (I);
- an exhaust passage situated downstream in the gas flow of the first and the second exhaust gas turbines;
- an exhaust duct leading from the exhaust gas chamber to the exhaust passage; and
- a regulating valve arranged in the exhaust duct and operable for regulating the exhaust gas flow through the exhaust duct.

* * * * *